US 8,370,110 B2

(12) United States Patent
Gupta

(10) Patent No.: US 8,370,110 B2
(45) Date of Patent: Feb. 5, 2013

(54) NETWORK PERFORMANCE MANAGEMENT

(75) Inventor: Manvendra Gupta, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 12/336,353

(22) Filed: Dec. 16, 2008

(65) Prior Publication Data

US 2009/0164173 A1   Jun. 25, 2009

(30) Foreign Application Priority Data

Dec. 19, 2007   (GB) .................................. 07150143.1

(51) Int. Cl.
*G06F 11/30* (2006.01)
*G06F 17/40* (2006.01)
(52) U.S. Cl. ......... 702/186; 702/182; 702/183; 702/187
(58) Field of Classification Search .................. 702/186, 702/182, 183, 187
See application file for complete search history.

(56) References Cited

U.S. PATENT DOCUMENTS

| 5,627,766 A * | 5/1997 | Beaven .......................... 702/122 |
| 5,822,398 A * | 10/1998 | Hall et al. .................. 379/26.01 |
| 2004/0054776 A1 * | 3/2004 | Klotz et al. .................... 709/224 |

* cited by examiner

*Primary Examiner* — Phuong Huynh
(74) *Attorney, Agent, or Firm* — Yudel Isidore Ng Russell PLLC

(57) ABSTRACT

Measuring performance of a performance measuring tool comprises: a first data loader acquiring a first set of network data for passing to a first data channel; the first data channel calculating a first set of performance metrics using the first set of network data and storing the first network data and performance metrics in a database; a first data viewer displaying the first set of performance metrics; time stamping all operations performed in one or more of the acquisition, calculation and storing steps and saving the time stamp and operation details in a log file; a second data loader acquiring the time stamped data; a second data channel, calculating a second set of performance metrics using the time stamped data, storing the time stamped data and second set of performance metrics in the database; and a second data viewer, displaying the second performance metrics from the database.

10 Claims, 2 Drawing Sheets

NETWORK PERFORMANCE MANAGEMENT

PRIORITY

This application claims priority to Foreign Patent Application No. EP07150143.1 entitled "METHOD AND APPARATUS FOR NETWORK PERFORMANCE MANAGEMENT", filed on Dec. 19, 2007, and assigned to the same assignee. The entire content of that foreign application is incorporated herein by reference.

TECHNICAL FIELD

This invention relates to a method and apparatus for a network performance management system. In particular the invention relates to a method and apparatus for managing the performance of a network performance management system.

BACKGROUND

A network performance management system is a system that manages the performance of networks or network components. A network performance management system is one type of network management system.

A flexible performance management system that offers the ability to monitor performance data from a large range of data sources including networks, network components and network management systems. An enterprise performance management system that comprises scalable architecture for large scale performance management across global networks.

It is known to measure the performance and availability of host systems, and aspects such as the computer processing unit (CPU), disk, storage and network devices and network interfaces. However, there is no mechanism to measure the performance of components of a network performance management system, for example, the amount of CPU used by a component, or the amount of time spent by a component to load the data in the database. Not only is this level of granularity not available, but also, clients need to engage professional services for drafting these statistics for them. Given the lack of adequately trained resources, and the fact that most network performance management systems undergo continuous change, such estimates are approximations at best.

SUMMARY

According to a first aspect of the present invention there is provided a method of measuring performance of a performance measuring tool, comprising: a first data loader, acquiring a first set of network data associated with a first network component for passing to a first data channel; the first data channel, calculating a first set of performance metrics using the first set of network data, storing the first network data and performance metrics in a first location in a database; a first data viewer, displaying the first set of performance metrics from the database; time stamping all operations performed in one or more of the acquisition, calculation and storing steps and saving the time stamp and operation details in a log file; a second data loader, acquiring the time stamped data; a second data channel, calculating a second set of performance metrics using the time stamped data, storing the time stamped data and second set of performance metrics in a second location in the database; and a second data viewer, displaying the second performance metrics from the database.

According to a second aspect of the present invention there is provided a method of measuring performance of a performance measuring tool, the tool comprising at least one of each of: a data loader, a data channel, a database and a data viewer, the method comprising: acquiring, by a first data loader, a first set of network data associated with a first network component for passing to a first data channel; calculating, by the first data channel, a first set of performance metrics using the first set of network data associated with a first network component, storing the first network data and performance metrics in a first location in a database; displaying, by a first data viewer, the first set of performance metrics from the database; time stamping all the operations performed in one or more of the acquisition, calculation and storing steps and saving the time stamp and operation details in a log file; acquiring, by a second data loader, the time stamped data associated with one of the acquisition, calculation and storing steps; calculating, by a second data channel, a second set of performance metrics using the time stamped data associated with the one of the acquisition, calculation and storing steps, storing the time stamped data and second set of performance metrics in a second location in the database; and displaying, by a second data viewer, the second performance metrics from the database.

In the second aspect and others: the data loader, the data channel, the database and the data viewer components are referring to a DataLoad engine; a DataChannel engine, a DataMart database and a DataView engine in the preferred embodiment of the invention.

According to other aspects of the present invention there are provided systems and computer program products for measuring the performance of a performance measuring tool, said systems and computer program products used to implement the methods described above.

DESCRIPTION OF DRAWINGS

A preferred embodiment of the invention will now be described, by means of example only with reference to the accompanying drawings in which.

DETAILED DESCRIPTION

IBM* Netcool®*/Proviso®* is a type of network performance management system. (*IBM®, Netcool® and Proviso® are registered trademarks of International Business Machines in the United States and/or other countries.)

Figure 1:
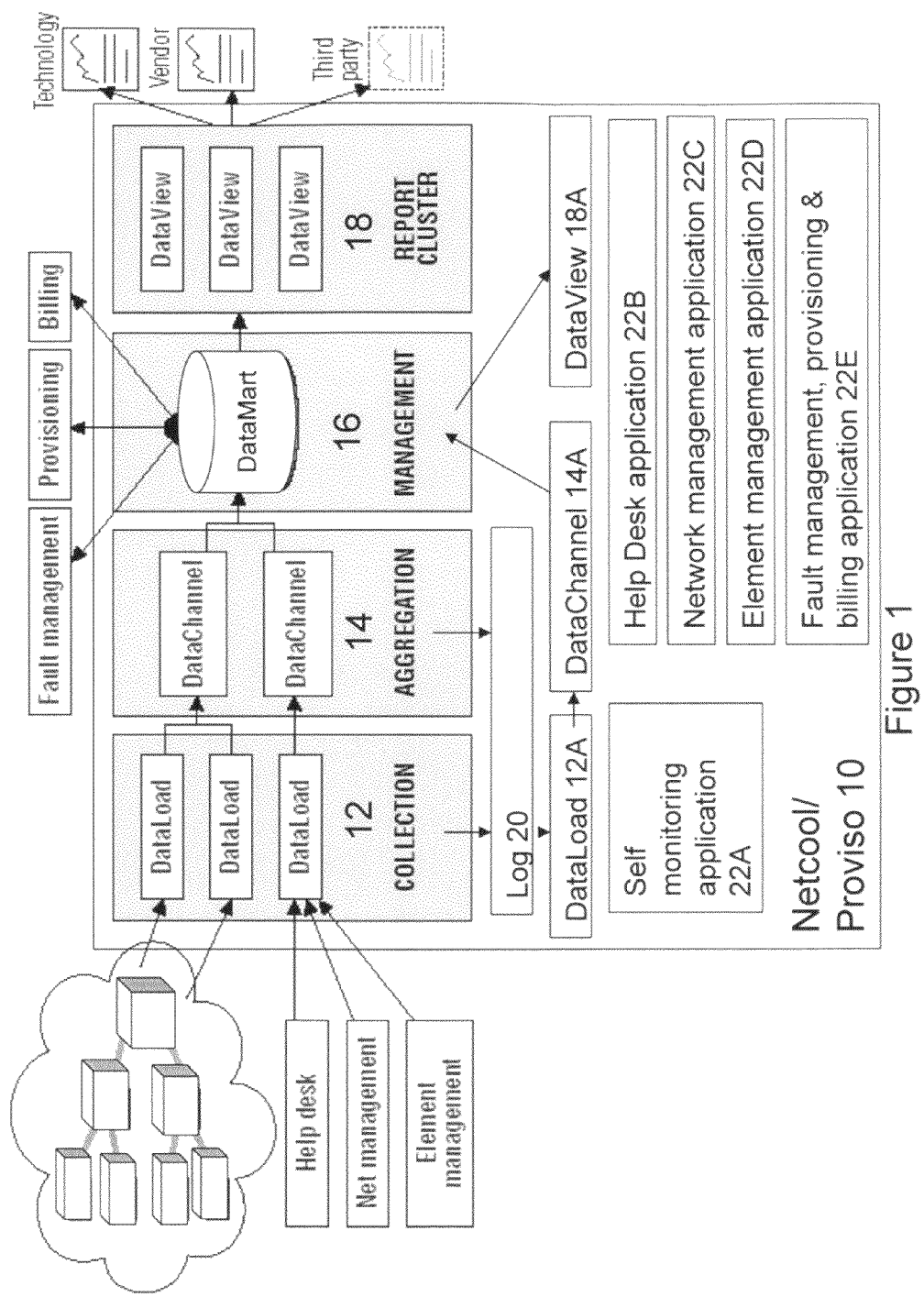
FIG. 1 illustrates a sample component diagram of Netcool/Proviso network performance management system according to the preferred embodiment.

A Netcool®/Proviso® network performance management system 10 comprises: DataLoad engines 12 and 12A; DataChannel engines 14 and 14A; a DataMart database 16; DataView engines 18 and 18A; a log 20; and applications 22A, 22B, 22C, and 22D (see FIG. 1). DataLoad engines collect network data; DataChannel engines aggregate performance metrics and store the metrics in the DataMart database; a DataMart database provides data management and applications; and a DataView engine produces and manages reports. Netcool/Proviso is configurable and each configuration is controlled by an application. The DataLoad and DataChannel engines time stamp and record operation details in log 20. The components will be described in more detail below. Netcool/Proviso 10 is a set of integrated modules that together form a network performance management system and that can be configured to measure the performance of the integrated modules.

Each DataLoad engine 12 and 12A provides flexible, distributed data collection and data import of Simple Network Management Protocol (SNMP) and non-SNMP data to a centralized database. A DataLoad engine comprises: an SNMP collector; a Bulk Collector; and a File Transfer Engine (FTE). The SNMP collector provides raw data files to the DataChannel. The Bulk Collector provides non-SNMP based metric collection, such as the following: device files; management station files; flow information files and customer relationship management (CRM) information files. The bulk collector creates both data files and resource files. The data files go through processing by a DataChannel engine. The resource files are sent to a DataMart engine. DataLoad engine 12A is different from other DataLoad engines 12 in that it collects and imports data in log 20 collected from DataLoad engines 12 and DataChannel Engines 14.

Each DataChannel engine 14, 14A provides a set of channel processors and channel management components for data collection. Each DataChannel engine aggregates the data that is collected through a DataLoad engine for use by reporting functions in a DataView engine. Essentially, a DataChannel engine creates the following aggregations: resource aggregation for every metric and resource; group aggregation of every group; and user-defined aggregation computed from raw data. A DataChannel engine also processes on-line calculations and detects real-time threshold violations such as the following: raw data violating configured thresholds; raw data violating configured thresholds and exceeding these thresholds during a specific duration of time; and averaged data violating configured thresholds. A DataChannel engine comprises a Complex Metric Engine (CME) for performing on-the-fly calculations. These calculations include time aggregations for resources and groups, as well as a variety of calculations using raw data, thresholds, properties, and constants as inputs. CME also computes aggregations for both individual resources and resource groups. CME runs as a server process and processes SNMP or Bulk data streams for a single or multiple SNMP or Bulk Collectors. It maintains the statistics used for the determination of threshold violations and writes properties to the database. DataChannel engine 14A is different from the other DataChannel engines 14 because it only processes and manages the data collection of DataLoad engine 12A.

The Complex Metric Engine (CME) is a component in a DataChannel that performs calculations on data gathered by the SNMP or bulk collectors deployed in a network. These calculations include the following: Pre-defined formulas that are provided by an application; user-defined formulas created using the CME Formula API; and time aggregations for sub-elements. In addition to performing calculations on the data stream in the DataChannel, the CME also buffers and sorts metric records according to resource identifiers (RIDS) and metric identifiers (MIDs) to optimize how the data and metrics are stored in the database.

The CME is designed to work with data that is gathered over the space of a single period. Within that period, there are several distinct phases that characterize the operation of the CME: loading phase; building phase; processing phase; and output phase.

Loading phase. During the beginning of each period, the CME creates a new network configuration model based on the inventory structure that exists in the database at that time. This model is used as a snapshot of the network environment and serves as the basis for all metric processing for the entire duration of the period. At the end of the period, the CME polls the database for any changes that have been made to the inventory and creates a new network configuration model for the next period. As the CME reloads its configuration periodically, any metrics produced by sub-elements following the last polling period are rejected by the CME until the beginning of the next period.

Building phase. Once the current configuration model has been built, the CME creates a table of sub-elements and metrics that are expected for the current period. The CME uses the RIDs and MIDs to build the table and determine which metrics should be arriving from the collectors. The table also specifies how resources are related, and determines if there are any CME formulas that must be applied to a sub-element's metrics once the data is gathered. Processing Phase. Whenever new data arrives at the CME, it is evaluated and stored in the appropriate table location, along with any Resource Aggregation information. Once the input and processing dependencies for a metric in the table have been met, the CME processes the metrics and stores the data until the end of the period.

Output Phase. At the end of the current period, the CME outputs everything in memory to the DataLoad engines. The data sent to the DataLoad engines includes the sorted data for the current period, and resource and group aggregations for each of the processing periods up to the current time. For example, an hourly DataLoad engine can compute group and resource aggregations, while a daily DataLoad engine can create metric statistics and inserts the data into the database.

DataMart database 16 is a service-level management solution architected for the mission-critical network needs of network service providers. It provides scalable data management, storage, and retrieval and integration with the Operations Support System (OSS). DataMart engine 16 stores data collected and processed by DataChannel engines and DataLoad engines, and provides applications that support the following: the discovery of network elements and sub-elements; the synchronization of the new data with already stored data; the running of automatic grouping; the creation of data requests; the creation of new formulas; and the editing of resources, groups, properties, and thresholds.

Each DataView engine 18, 18A is a reliable application server for on-demand, web-based network reports derived from the collected network data. The data collected, processed, and stored in the database by Netcool/Proviso is organized and output for customers using reporter sets that are designed by developers and Professional Services personnel for a specific application. An application reporter set is a related group of reports that provide performance information on a specific set of devices or resources that exist in a network. Each report consists of a series of queries that retrieve related sub-elements and their corresponding metrics from the database using the RIDs and MIDs assigned during the inventory and collection processes. The retrieved results are then organized within the report and are displayed on a web portal in the form of tables, graphs, and charts. DataView Engine 18A is different from other DataView engines 18 because it only creates reports for data collected by log 20.

Log 20 allows Common Object Request Broker Architecture (CORBA) communications and writes the log messages to a central Netcool/Proviso file, which has a well-defined format. This log file can grow to 500 MB per day in a typical installation and has extremely granular information about the processing performed by each component. The preferred embodiment uses a bulk application to read the contents of this file periodically, and feed them back into the DataMart database. This will then allow clients to: determine the state of each DataChannel; determine the amount of resource consumed by the various processes within a DataChannel; determine the health of a DataChannel; trend and forecast the platform growth; monitor the hourly performance statistics of the SNMP DataLoader engines; monitor the various errors encountered by each Proviso process; and optionally configure SNMP traps for violations.

Applications extend the Netcool/Proviso system with service-ready reports for network operations, business development, and customer viewing. Applications are individually installed modules that contain discovery, grouping, collection, and reporting instructions created by developers for a specific network technology or network equipment provider. Once installed, an application configures Netcool/Proviso for inventory and group specific network resources, performs mathematical calculations on raw or aggregated data streams collected from these resources, and produces key performance monitoring metrics that are stored on the Netcool/Proviso database. Reporter sets designed for each application query the database for this information and display the results on a web portal in the form of specialized report tables, graphs, and charts.

The following is a general description of how applications work with Netcool/Proviso to collect, process, load, and report data from a network environment. After an application has been installed, an inventory process must be run so that the application's target network resources can be identified and modelled within Netcool/Proviso as sub-elements. Sub-elements must be created before data from any network resource can be collected, processed, and stored in the DataMart database. How sub-elements are discovered depends on whether the target resources are SNMP resources or non-SNMP Resources. For SNMP network resources, an application provides a discovery formula. Discovery formulas are used to evaluate network resources, determine which resources become sub-elements, and set values for items defined as properties in the formula. For non-SNMP network resources, an application provides a Bulk Adaptor Design File. Bulk Adaptor Design Files define how data fields that reside in files generated by network resources are used to create sub-elements and set values for items defined as properties. Netcool/Proviso is a non-SNMP resource for the purposes of the preferred embodiment. During the database synchronization phase of the inventory process, the list of discovered sub-elements is compared to what exists in the database. Newly discovered sub-elements are assigned a resource identifier (RID) and timestamp, and the database uses both items to create a new entry for the sub-element to reflect the known state of the network inventory. Once all the sub-elements have been discovered and created in the database, the inventory process organizes the sub-elements according to the grouping rules provided by an application. The grouping rules use the properties and values defined within inventory formulas or adaptor design files to filter the sub-elements into their appropriate collection or reporting groups.

Following the completion of the inventory process, Netcool/Proviso is ready to collect performance data for an application's target network resources. An application provides Netcool/Proviso with collection formulas that instruct a DataLoad engine to collect specific types of performance data against a particular sub-element. The types of collection formulas applied to the data depend on whether the sub-element is an SNMP resource or non-SNMP resource. For SNMP network resources, an application provides SNMP collection formulas. SNMP collection formulas instruct the SNMP Collector to take the data gathered during a specified collection interval, perform some mathematical operation on the data, and output the result as a performance metric. For non-SNMP network resources, an application provides bulk collection formulas. A bulk collection formula, unlike an SNMP collection formula, has no executable instructions. A bulk collection formula consists of a metric name that is mapped by a bulk adaptor design file to a statistic that resides in the input file generated by a network resource. Either type of collection formula outputs a metric and corresponding unique metric identifier (MID) that is passed along the DataChannel engine to the Complex Metric Engine for processing.

Figure 2:
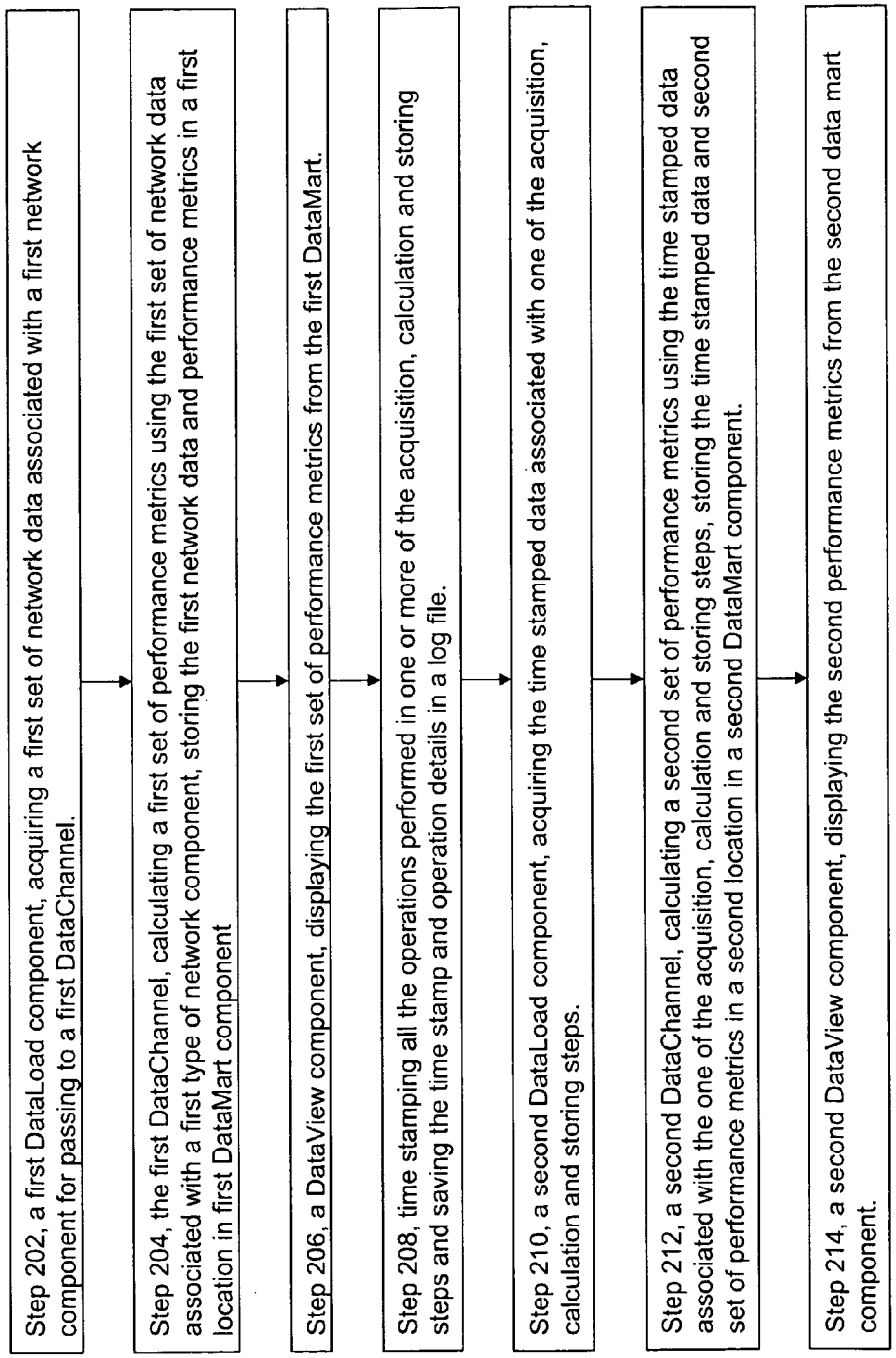
FIG. 2 illustrates a flow diagram of the process of the Netcool/Proviso network performance management system according to the preferred embodiment.

The method steps of the preferred embodiment of the invention are now described with reference to FIG. 2.

Step 202, a first DataLoad engine 12 acquiring a first set of network data associated with a first network component for passing to a first DataChannel engine 14.

Step 204, the first DataChannel engine 14, calculating a first set of performance metrics using the first set of network data associated with the first network component, storing the first set of network data and performance metrics in a first location in a DataMart database 16.

Step 206, a DataView engine 18, displaying the first set of performance metrics from the DataMart database 16. The first set of network data; the first network component; the first DataChannel engine; the first performance metrics; the first location; and the DataMart engine are all defined in a first application (for example 22B, 22C, 22D or 22E) that is integrated into the tool.

Step 208, time stamping all the operations performed in one or more of the acquisition, calculation and storing steps and saving the time stamp and operation details in a log file 20.

Step 210, a second DataLoad engine 12A, acquiring the time stamped data associated with one of the acquisition, calculation and storing steps.

Step 212, a second DataChannel engine 14A, calculating a second set of performance metrics (using the time stamped data associated with the one of the acquisition, calculation and storing steps) and storing the time stamped data and second set of performance metrics in a second location in the DataMart database 16.

Step 214, a second DataView engine 18A, displaying the second performance metrics from the DataMart database 16. The second DataLoad engine 12A, the second DataChannel engine 14A, the second set of performance metrics, the second location, the DataMart database 16; and the second DataView engine 18A are all defined in a second application 22A integrated into the tool.

An example of the operation of the Netcool/Proviso network performance management system of the preferred embodiment is described below.

Step 202, a first DataLoad engine 12 "DISC.DEV19.1-13308", acquires a first set of network data associated with a first network component "192.168.68.173" for passing to a first DataChannel engine 14. The component "DISC" (or Discovery), running on the host "DEV 19", with process ID "13308", issues two requests "CHKDISCOVERY" to IP address "192.168.68.173" using the formula "Basic Element". In this example, the performance of the DataLoad engine "DISC.DEV19.1-13308" is under investigation.

Step 204, the first DataChannel engine 14, calculating a first set of performance metrics using the first set of network data associated with a first network component "192.168.68.173", storing the first network data and performance metrics in a first location in a DataMart database 16. In this example the first DataChannel engine 14 and calculation step are not considered. In other examples, the calculation step might be considered with or without the acquisition step.

Step 206, a DataView engine 18, displaying the first set of performance metrics from the DataMart database 16. The first set of network data; the first network component; the first DataChannel engine 14; the first performance metrics; the first location; and the DataMart database 16 are all defined in a first application that is integrated into the tool. In this example the DataView engine 18 and the view step are not considered. In other examples, the view step might be considered with or without the acquisition and calculating step.

Step 208, time stamping the acquisition operation and saving the time stamp and operation details in the log file 20. One example in the log file 20 reads:
2005.03.15-18.58.28 DataLoader DISC.DEV19.1-13308 2 CHKDISCOVERY
R00020/192.168.68.173. Family:Generic~Agent, try discoveryFormula Formula (Basic_Element—7486 string)
2005.03.15-18.58.32 DataLoader DISC.DEV19.1-13308 2 DISCEMPTY
R00020/192.168.68.173. No results from discovery formula for family 'Generic~Agent'.

Entries in the Netcool/Proviso log file 20 have the following format: <formatted date><facility><severity>[<msg code>]<message><information>. <formatted date> is a formatted date string YYYY.MM.DD-hh.mm.ss. <facility> indicates the type of program that made the log file entry (in this DataLoader). <severity> can be one of the following: I—informational; W—Warning; F—Failure; 1—Debug level 1; 2—Debug level 2; 3—Debug level 3; <msg code> is a registered msg code for fatal and warning log messages; <message> indicates the basic type of the message; and <information> is an additional text message.

Step 210, a second DataLoad 12A engine, acquiring the above time stamped data associated with the acquisition, calculation and storing steps.

Step 212, a second DataChannel engine 14B, calculating a second set of performance metrics using the time stamped data associated with the one of the acquisition, calculation and storing steps, storing the time stamped data and second set of performance metrics in a second location in the DataMart engine 16. Using these two log file lines, the second DataChannel engine 14B can decipher, that the DataLoad engine "DISC.DEV19.1-13308" took 4 seconds to run that formula, and did not find any results for that formula against the device 192.168.68.173. The first performance metric of the second set of performance metrics would read: "DISC.DEV19.1-13308" took 4 seconds to run formula, and did not find any results for that formula against the device 192.168.68.173". Subsequent performance results would be different depending on the number of seconds taken to run the formula and the results found against the device.

Step 214, a second DataView engine 18A, displaying the second performance metrics from the DataMart engine simply displays: "DISC.DEV19.1-13308" took 4 seconds to run formula, and did not find any results for that formula against the device 192.168.68.173". The second DataLoad engine 12A, the second DataChannel engine 14A, the second set of performance metrics, the second location, the DataMart engine 16; and the second DataView engine 18A are all defined in a self monitoring application 22A integrated into the tool.

Further embodiments of the invention are now described.

Method in logic apparatus embodiment. It will be clear to one skilled in the art that the method of the present invention may suitably be embodied in a logic apparatus comprising logic means to perform the steps of the method, and that such logic means may comprise hardware components or firmware components.

Logic array embodiment. It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed media.

Multiple processor embodiment. It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired media.

Computer program product embodiment. The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, The series of computer readable instructions embodies all or part of the functionality previously described herein.

Programming language embodiments. Those skilled in the art will appreciate that such computer readable instructions can be written in a number of programming languages for use with many computer architectures or operating systems.

Memory and communication technology. Those skilled in the art will appreciate that computer readable instructions may be stored using any memory technology, including but not limited to, semiconductor, magnetic, or optical devices, or microwave.

Distributable medium embodiment. It is contemplated that such a computer program product may be distributed as a removable medium with accompanying printed or electronic documentation, for example, shrink-wrapped software, preloaded with a computer system, for example, on a system ROM or fixed disk.

Service deployment embodiment. While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Service integration embodiment. The process software is integrated into a client, server and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

On demand embodiments. The process software is shared, simultaneously serving multiple customers in a flexible, automated fashion. It is standardized, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to influence the performance of that server, other servers are accessed to increase the capacity and to share the workload.

Likewise when other measurements of use, for example network bandwidth, memory usage, and storage usage, approach a capacity so as to influence performance, additional resources are added to share the workload. The measurements of use used for each service and customer are sent to a collecting server that sums the measurements of use for each customer for each service that was processed anywhere in the network of servers that provide the shared execution of the process software. The summed measurements of use are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

VPN embodiments. The process software may be deployed, accessed and executed through the use of a virtual private network (VPN), which is any combination of technologies that can be used to secure a connection through an otherwise unsecured network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid. The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a companies multiple fixed sites over a public network such as the Internet. The process software is transported over the VPN via tunneling which is the process of placing an entire packet within another packet and sending it over a network. The protocol of the outer packet is understood by the network and both points, called tunnel interfaces, where the packet enters and exits the network.

The invention claimed is:

1. A method of measuring performance of a performance measuring tool, the method comprising:
   the performance measuring tool performing acquisition operations on a first set of network data associated with a first network component;
   performing a calculation on the first set of network data associated with a first network component;
   storing the first set of network data and performance metrics in a first storage location;
   displaying the first set of performance metrics stored in the first storage location;

time stamping all the operations performed in one or more of the acquisition, calculation and storing functions;
storing each operation details and time stamp in a log file; acquiring time stamped data associated with one of the acquisition, calculation and storing functions;
calculating a second set of performance metrics using the time stamped data associated with at least one of the acquisition, calculation and storing functions;
storing the time stamped data and second set of performance metrics in a second storage location; and
displaying the second performance metrics from the second storage location.

2. A method of measuring performance of a performance measuring tool, said performance measuring tool comprising at least one of: a data loader, a data channel, a database and a data viewer, said method comprising:
acquiring, by a first data loader, a first set of network data associated with a first network component for passing to a first data channel;
calculating a first set of performance metrics using the first set of network data associated with a first network component, storing the first set of network data and performance metrics in a first location in a database;
displaying, by a first data viewer, the first set of performance metrics from the database;
time stamping all the operations performed in one or more of the acquiring, calculating, and storing steps and saving the time stamp and operation details in a log file;
acquiring, by a second data loader, time stamped data associated with one of the acquiring, calculating, and storing steps;
calculating a second set of performance metrics using the time stamped data associated with the one of the acquiring, calculating, and storing steps, storing the time stamped data and second set of performance metrics in a second location in the database; and
displaying, by a second data viewer, the second set of performance metrics from the database.

3. A method according to claim 2, wherein the first set of network data, the first network component, the first data loader, a the first data channel, the first set of performance metrics, the first location, and the database are all defined in a first application that is integrated into the performance measuring tool.

4. A method according to claim 3 wherein the second data loader, a second data channel, the second set of performance metrics, the second location, the database, and a second data view component are all defined in a second application integrated into the performance measuring tool.

5. A system for measuring performance of a performance measuring tool, the system comprising:
logic that performs acquisition operations on a first set of network data associated with a first network component;
logic that performs calculation on a first set of performance metrics using the first set of network data associated with a first type of network component;
logic that performs storing operations of the first network data and performance metrics in a first storage location;
logic for displaying the first set of performance metrics from the first storage location;
logic for time stamping all the operations performed in one or more of the acquisition, calculation and storing functions and storing each operation details and time stamp in a log file;
logic for acquiring time stamped data associated with one of the acquisition, calculation and storing functions;
logic for calculating a second set of performance metrics using the time stamped data associated with the one of the acquisition, calculation and storing functions;
logic for storing the time stamped data and second set of performance metrics in a second storage location; and
the performance measuring tool displaying the second performance metrics from the second storage location.

6. A system for measuring performance of a performance measuring tool comprising:
a first data loader for acquiring a first set of network data associated with a first network component for passing to a first data channel;
logic for calculating a first set of performance metrics using the first set of network data associated with a first type of network component, and for storing the first set of network data and performance metrics in a first location in a database;
a first data viewer component for displaying the first set of performance metrics from the database;
a logger for time stamping all the operations performed in one or more of the first data loader and first data channel and saving the time stamp and operation details in a log file;
a second data loader for acquiring time stamped data associated with one of the first data loader and first data channel;
logic for calculating a second set of performance metrics using the time stamped data associated with the one of the first data loader and first data channel storing the time stamped data and second set of performance metrics in a second location in the database; and
a second data viewer for displaying the second set of performance metrics from the database.

7. A system according to claim 6, wherein the first set of network data, the first network component, the first data loader, the first data channel, the first performance metrics, the first location, and the database are all defined in a first application that is integrated into the tool.

8. A system according to claim 6, wherein the second data loader, the second data channel, the second set of performance metrics, the second location, the database, and a second data view component are all defined in a second application integrated into the tool.

9. A non-transitory computer program product comprising a computer readable recording device having computer readable code stored thereon for measuring performance of a performance measuring tool, said computer readable code, when loaded onto a computer system and executed, performs the following functions:
performing acquisition operations on a first set of network data associated with a first network component;
performing calculation operations on a first set of performance metrics using the first set of network data associated with a first type of network component;
performing storing operations for the first network data and performance metrics in a first storage location;
displaying the first set of performance metrics from the first storage location;
time stamping all the operations performed in one or more of the acquiring, calculating, and storing functions and storing each operation details and time stamp in a log file;
acquiring time stamped data associated with one of the acquiring, calculating, and storing functions;
calculating a second set of performance metrics using the time stamped data associated with the one of the acquiring, calculating, and storing functions;

storing the time stamped data and second set of performance metrics in a second storage location; and displaying the second performance metrics from the second storage location.

10. A non-transitory computer program product comprising a computer readable recording device having computer readable code stored thereon for measuring performance of a performance measuring tool, said computer readable code, when loaded onto a computer system and executed, performs the following functions:

a first data loader, acquiring a first set of network data associated with a first network component for passing to a first data channel;

calculating a first set of performance metrics using the first set of network data associated with a first type of network component, storing the first set of network data and performance metrics in a first location in a database;

a first data viewer component, displaying the first set of performance metrics from the database;

time stamping all the operations performed in one or more of the acquiring, calculating, and storing steps and saving the time stamp and operation details in a log file, wherein the time stamping comprises: a second data loader, acquiring time stamped data associated with one of the acquiring, calculating, and storing steps;

calculating a second set of performance metrics using the time stamped data associated with the one of the acquiring, calculating, and storing steps, storing the time stamped data and second set of performance metrics in a second location in the database; and a second data viewer, displaying the second set of performance metrics from the database.

* * * * *